United States Patent Office 3,115,481
Patented Dec. 24, 1963

3,115,481
POLYURETHANE COLLAPSED FOAM
ELASTOMER
Kenneth A. Pigott and William Archer, Jr., New Martinsville, W. Va., assignors to Mobay Chemical Company, Pittsburgh, Pa., a corporation of Delaware
No Drawing. Filed Apr. 7, 1958, Ser. No. 726,645
11 Claims. (Cl. 260—77.5)

This invention relates generally to polyurethane plastics and, more particularly, to a novel method for making solidified, rubber-like, substantially non-porous polyurethane plastics having improved abrasion resistance and hydrolysis aging characteristics.

It has been proposed heretofore to manufacture solidified, rubber-like, substantially non-porous polyurethane plastics by reacting a substantially linear organic compound having at least two reactive hydrogen atoms with an organic diisocyanate and a chain extender or cross-linking agent. Of the available organic compounds having reactive hydrogen atoms, the polyesters prepared by esterification of a dicarboxylic acid and a glycol have been most popular commercially. It has been disclosed, however, that polyalkylene ether glycols may be substituted for the polyesters.

The chemical composition of the reaction mixture from which the polyurethane is formed is varied somewhat depending upon whether a castable resin or a millable gum is desired. In preparing a castable resin, an organic diisocyanate is reacted with a polyester or the like under substantially anhydrous conditions and the resulting prepolymer having terminal isocyanate groups is reacted with only enough organic chain extender, such as a glycol, diamine, amino alcohol or the like, to react with the terminal groups of the prepolymer. The mixture of prepolymer and chain extender is cast in a mold before complete chemical reaction. In the preparation of a polyurethane product by forming a millable gum and then curing the gum, the polyester or similar compound is first reacted with an organic diisocyanate in such an amount that a prepolymer having terminal isocyanate groups is formed. This product is reacted with a chain extender, such as a diamine or a glycol, and a gum-like product is obtained. The gum is then placed on a rubber mill and processed along with an additional organic polyisocyanate which reacts with the terminal amino or hydroxyl groups of the gum to form a sheet-like cured product. Another procedure which has been disclosed for making a millable gum involves reacting a polyester or similar material with less than an equivalent amount of organic diisocyanate to form a product having terminal hydroxyl groups. This product is then processed on a rubber mill with an organic diisocyanate in accordance with substantially the same procedure as that described immediately above for processing the gum prepared with the chain extender.

It has been proposed to prepare a millable gum by reacting a polyester and water simultaneously with an organic diisocyanate. Such a process is disclosed in U.S. Patent 2,785,150. In accordance with that process, the organic diisocyanate is mixed with the water and polyester in such proportions that one mol of organic diisocyanate is present for each mol of polyester and water. The resulting product is processed on a rubber mill until a rubber-like product is obtained with additional organic diisocyanate being added on the mill in a quantity such that the total mols used throughout the process is about two times the number of mols of water and polyester.

Although the heretofore available solidified, rubber-like, substantially non-porous polyurethanes have many very desirable characteristics which make them superior to rubber for many purposes, they have not been adopted for making all products customarily made from rubber. For example, vehicle tires are still made commerically in this country from rubber because the heretofore available polyurethanes have not been readily adaptable to processing in the same equipment now used by the tire industry in making rubber tires. Moreover, the heretofore available products have not had the abrasion resistance desired in vehicle tires and have been somewhat subject to hydrolytic degradation.

It is therefore an object of this invention to provide a method for making a solidified, rubber-like, substantially non-porous polyurethane devoid of the foregoing disadvantages. Another object of the invention is to provide a novel method for making a solidified, rubber-like, substantially non-porous polyurethane having improved abrasion resistance and hydrolysis aging characteristics. A still further object of the invention is to provide a vehicle tire shaped from a composition containing the novel polyurethane provided by this invention.

It has now been found that a solidified, rubber-like, substantially non-porous polyurethane plastic having improved abrasion resistance and hydrolysis aging characteristics can be provided by reacting a polyether having terminal hydroxyl groups and water simultaneously with an organic diisocyanate under conditions such that a millable gum is prepared and thereafter curing the gum with additional organic diisocyanate while processing the gum on a conventional rubber mill or other suitable apparatus. The proportions of materials and the processing conditions must be carefully controlled to produce the desired product. The composition of the reaction mixture must be such that a stable cellular polyurethane is not obtained. The invention thus contemplates a process wherein a polyether having terminal hydroxyl groups, a molecular weight of at least about 1,000 and, preferably, not above about 5,000 and from about 1 percent to about 2 percent water, based on the weight of the polyether, are reacted with an organic diisocyanate. The amount of organic diisocyanate mixed with the polyether and water must be such that from about 0.65 equivalent to about 0.85 equivalent diisocyanate are present for each active hydrogen in the polyether-water mixture.

In accordance with the process provided by this invention, the polyether, water and organic diisocyanate are mixed together in any suitable device, such as, for example, the apparatus disclosed in U.S. Patent 2,764,565, and after the components are completely mixed together and before any substantial chemical reaction has occurred, the mixture is discharged or otherwise removed from the mixing zone and placed in a suitable container where chemical reaction can proceed. A gas believed to be carbon dioxide is formed during the reaction, and the reaction mixture increases in volume and becomes a cellular product. Before the cellular product solidifies, however, it collapses and forms a gum-like material adapted to be processed on a rubber mill after curing. Preferably, the collapsed product is heated to a temperature of about 90° C. or above to shorten the curing time to from about 12 to about 24 hours. The cured gum may be transferred immediately or at some later time to a rubber mill where it is mixed with an organic diisocyanate; preferably, the dimer of 2,4-toluylene diisocyanate. After complete mixing of the diisocyanate with the gum, the mixture is transferred to a suitable mold where heat and pressure are applied to form a solidified molded product.

Any suitable polyether having terminal hydroxyl groups and the hereinbefore specified molecular weight may be used. The polyether may be a linear compound prepared by condensing an alkylene oxide or by condensing an alkyene oxide with a glycol. Alternatively, a branched polyether prepared by condensation of an alkylene oxide with a trihydric organic compound may be used in mixture with the linear polyether. The alkylene oxide is preferably either ethylene oxide or propylene oxide. The polyether most preferred by this invention is prepared by condensing one of these alkylene oxides to form a substantially linear product having a molecular weight of from about 1,000 to about 3,000, and preferably from about 1,200 to about 2,000. A poly ether prepared by condensation of an alkylene oxide and a triol, such as, for example, glycerine, trimethylol propane or the like, may be used in admixture with a linear polyether prepared by condensation of an alkylene oxide but, for best results, not more than about 50 percent of the mixture should be high molecular weight triol. Such a triol prepared by condensation of an alkylene oxide, such as, for example, ethylene oxide, propylene oxide or mixtures thereof, and a triol, for example, glycerine, has three chains, each having a molecular weight of from about 335 to about 1500. This triol can be represented by the following formula:

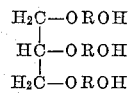

wherein R is a bivalent organic radical derived by condensation of an alkylene oxide and the polyether has a molecular weight of at least about 1,000. The trihydroxy compound used in preparing the triol contemplated by this invention may be glycerine, trimethylol propane, castor oil, hexane triol or any other suitable trihydroxy compound. The polyether may also be a polyalkylene ether glycol prepared by polymerizing tetrahydrofuran. In any event, the polyether should have at least one chain of polymethylene groups connected together with hetero oxygen and/or sulfur atoms and a molecular weight of at least about 1,000. Preferably, the hydroxyl number will not be substantially more than about 112.

Any suitable organic diisocyanate may be used in preparing the gum by reaction with water and polyether. For example, 1,5-naphthylene diisocyanate, 4,4'-diphenyl methane diisocyanate, p-phenylene diisocyanate, m-phenylene diisocyanate, hexamethylene diisocyanate, 2-nitro-4,4'-phenylene diisocyanate, 2-chloro-4,4'-phenylene diisocyanate, and the like, may be used. However, 2,4-toluylene diisocyanate and 2,6-toluylene diisocyanate or mixtures thereof are preferred for preparing the gum because they are readily available commercially.

Although any suitable organic diisocyanate including the examples listed above may be used in an amount of from about 6 parts to about 10 parts per 100 parts gum in further processing the gum on the rubber mill, it is much preferred to use the dimer of 2,4-toluylene diisocyanate. This compound is believed to have the following formula:

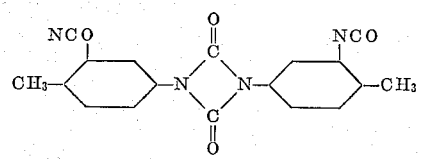

In order better to describe and further clarify the invention, the following are embodiments thereof:

About 100 parts by weight of a polyalkylene ether glycol, prepared by thermal condensation of ethylene oxide, having a molecular weight of about 2,000 and an hydroxyl number of about 56 are mixed with about 1.4 parts by weight water and about 18.3 parts by weight 2,4-toluylene diisocyanate. The mixing may be achieved by injecting the water and toluylene diisocyanate in separate streams into the polyalkylene ether glycol or the polyalkylene ether glycol may be mixed with the water first and the diisocyanate may then be injected into a stream of the polyalkylene ether glycol-water mixture. The apparatus disclosed by Hoppe et al., in U.S. Patent 2,764,565, may be used for mixing these components together. After the components are mixed together substantially uniformly, the mixture is discharged into a suitable container where chemical reaction occurs with foaming of the product caused by the formation of carbon dioxide. The resulting cellular product is unstable, however, and collapses before solidification of the reaction mixture.

The collapsed product is placed in a suitable oven or other heating device and maintained at a temperature of about 90° C. until the reaction mixture has solidified into a gum. Usually from about 12 hours to about 24 hours will be required at this temperature to produce a gum suitable for processing on a rubber mill or other device.

The gum is mixed with from about 0.05 percent to about 1 percent stearic acid or any other suitable compounding agent and the mixture is processed on a rubber mill until a sheet-like product is obtained. Usually from about 5 minutes to about 10 minutes processing on the rubber mill will bring about sheet formation. From about 4 to about 10 parts 2,4-toluylene diisocyanate dimer are added per 100 parts gum while continuing the processing on the rubber mill until the dimer is substantially completely dispersed throughout the gum-like material. Substantially complete mixing of the two components can usually be achieved with not more than about 5 minutes processing on the rubber mill. The product is then transferred to a suitable mold where it is subjected to a hydraulic pressure of from about 100 pounds to about 1500 pounds per square inch while at a temperature of from about 225° F. to about 340° F. for from about 15 minutes to about 1 hour to produce a cast solidified substantially non-porous product.

In another embodiment of the invention, a compound having three terminal hydroxyl groups is prepared by condensing either ethylene oxide or propylene oxide or mixtures thereof with trimethylol propane in such proportions that the resulting triol has a molecular weight of about 4500 and is composed of three chains having a molecular weight of about 1500 each per molecule. About 50 parts by weight of this triol are mixed with about 50 parts of a polyalkylene ether glycol prepared by thermal condensation of ethylene oxide, propylene oxide or mixtures thereof. The polyalkylene ether glycol has a molecular weight of about 2000 and an OH number of about 56. The triol and polyalkylene ether glycol have been previously dehydrated until the total amount of water present in the resulting mixture of triol and polyalkylene ether glycol is about 2 percent by weight. About 19 parts by weight 2,4-toluylene diisocyanate are injected under pressure into the polyalkylene ether glycol-triol mixture in accordance with the process disclosed in the aforesaid Hoppe et al. Patent 2,764,565 and after the diisocyanate has been intimately mixed with the polyalkylene ether glycol-triol mixture, the mixture is discharged into a container before any substantial amount of chemical reaction. Foaming occurs with chemical reaction between the components to form a polyurethane of greater molecular weight than that of the triol or polyalkylene ether glycol. The cellular product is unstable, however, and collapses before solidification.

The collapsed polyurethane is heat-treated in an oven or other suitable device at a temperature of about 90° C. until a solidified gum is formed. The gum is then worked on a rubber mill or in a Banbury mixer while adding about 1 percent stearic acid, wax, soap, or other compounding agent thereto. About 30 parts by weight reinforcing black which may be any suitable carbon black is added and the mixture is processed on a rubber mill until the reinforcing black is substantially completely dispersed throughout the gum. About 10 parts by weight 2,4-toluylene diisocyanate dimer are added per 100 parts gum on the rubber mill and processing is continued until substantially complete dispersion of the dimer throughout the gum is achieved.

The gum containing the dimer is transferred to a suitable mold where it is compressed under a pressure of about 1500 pounds per square inch while at a temperature of about 265° F. for about one hour.

The abrasion resistance of this product expressed as a wear index determined with a National Bureau of Standards abrader is three times that of a product prepared from a millable gum in which ethylene glycol was used as the chain extender instead of water. The National Bureau of Standards abrader determines the abrasion resistance of a rubber-like material by rotating a suitable piece of sandpaper against a sample of the rubber-like material. The product prepared in accordance with this embodiment of the invention has an abrasion resistance of about 0.3 as compared to an abrasion resistance of about 1.3 for the product prepared with ethylene glycol. The smaller the number the better the abrasion resistance because it is an indication of the amount of rubber-like material removed by the sandpaper. This product is particularly well suited for making vehicle tires because of its high abrasion resistance.

It is to be understood that any other organic diisocyanate disclosed herein as suitable may be substituted in the foregoing working examples for the 2,4-toluylene diisocyanate used to prepare the gums or for the 2,4-toluylene diisocyanate dimer used in curing the gum. Likewise, any other polyether disclosed as suitable above may be substituted for those in the foregoing embodiments. Other compounding agents, such as stearic acid, wax, soap or the like, may be substituted for the stearic acid in the foregoing embodiments and other trihydroxy compounds, such as, for example, glycerine, castor oil, hexanetriol or the like, may be used instead of trimethylol propane in preparing the triol of the foregoing embodiment. Likewise, any suitable reinforcing agent, such as, for example, calcium silicate, titanium dioxide, calcium carbonate, China clay or the like, may be substituted for the reinforcing black in the foregoing embodiment. Preferably, the particle size of the reinforcing agent should be from about 10 millimicrons to about 500 millimicrons in diameter.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. In the preparation of a solid, substantially nonporous, rubber-like polyurethane elastomer by a process wherein an organic diisocyanate is reacted with an organic compound having alcoholic hydroxyl groups to form an adduct having terminal hydroxyl groups, in a first step, and reacting the adduct with additional organic diisocyanate to form a cured solid elastomer, in a second step, the improvement which comprises mixing and reacting:
    (1) a polyalkylene ether alcohol having from 2 to 3 hydroxyl groups with not more than about 50% of said polyether alcohol having 3 hydroxyl groups, said polyalkylene ether alcohol having a molecular weight of at least about 1,000 and a hydroxyl number of not more than about 112; and
    (2) from about 1% to about 2% water based on the weight of said polyalkylene ether alcohol with
    (3) from about 65% to about 85% of that amount of an organic diisocyanate theoretically required for an —NCO group to react with each of the reactive hydrogen atoms of the water and hydroxyl groups of the polyalkylene ether alcohol to form an expanded cellular product, said cellular product collapsing into a gum-like hydroxyl-terminated polyurethane adduct, and thereafter mixing the hydroxyl-terminated polyurethane adduct with from about 6 parts to about 10 parts organic diisocyanate per 100 parts of said adduct and shaping the resulting mixture in a mold until the last said organic diisocyanate and gum-like material react to form a solidified, rubber-like, substantially nonporous polyurethane product.

2. The process of claim 1 wherein the said polyalkylene ether alcohol is a polyalkylene ether glycol.

3. The process of claim 1 wherein the diisocyanate mixed with the gum-like material is toluylene diisocyanate dimer.

4. A substantially nonporous polyurethane product prepared by a process comprising mixing and reacting:
    (1) a polyalkylene ether alcohol having from 2 to 3 hydroxyl groups with not more than about 50% of said polyether alcohol having 3 hydroxyl groups, said polyalkylene ether alcohol having a molecular weight of at least about 1,000 and a hydroxyl number of not more than about 112; and
    (2) from about 1% to about 2% water based on the weight of said polyalkylene ether alcohol with
    (3) from about 65% to about 85% of that amount of an organic diisocyanate theoretically required for an —NCO group to react with each of the reactive hydrogen atoms of the water and hydroxyl groups of the polyalkylene ether alcohol to form an expanded cellular product, said cellular product collapsing into a gum-like hydroxyl-terminated polyurethane adduct, and thereafter mixing the hydroxyl-terminated polyurethane adduct with from about 6 parts to about 10 parts organic diisocyanate per 100 parts of said adduct and shaping the resulting mixture in a mold until the last said organic diisocyanate and gum-like material react to form a solidified, rubber-like, substantially nonporous poly-urethane product.

5. The product of claim 4 wherein the said polyalkylene ether alcohol is a polyalkylene ether glycol.

6. The product of claim 4 wherein the said polyalkylene ether alcohol is a mixture of a polyalkylene ether glycol and a trihydric polyalkylene ether alcohol, said mixture containing not more than about 50 percent by weight of trihydric polyalkylene ether alcohol.

7. The product of claim 4 wherein the diisocyanate mixed with the gum-like material is toluylene diisocyanate dimer.

8. The product of claim 4 wherein the said polyalkylene ether alcohol is prepared by condensation of an alkylene oxide selected from the group consisting of ethylene oxide and propylene oxide.

9. A method for making a hydroxyl-terminated polyurethane adduct adapted to be cured into a rubber-like, substantially nonporous elastomer by reaction with an organic polyisocyanate which comprises mixing substantially simultaneously the polyalkylene ether alcohol having from 2 to 3 hydroxyl groups with not more than about 50% of the polyalkylene ether alcohol having 3 hydroxyl groups, said polyalkylene ether alcohol having a molecular weight of at least about 1,000 and a hydroxyl number of not more than about 112, from about 1% to about 2% water based on the weight of said polyalkylene ether alcohol, and from about 65% to about 85% of that amount of organic diisocyanate theoretically required for an —NCO group to react with each of the reactive hydrogen atoms of the water and hydroxyl groups of the polyalkylene ether alcohol to form an expanded cellular product, said cellular product collapsing into a gum-like hydroxyl-terminated polyurethane adduct.

10. A hydroxyl-terminated polyurethane adduct adapted to be cured into a rubber-like, substantially nonporous elastomer by reaction with an organic polyisocyanate prepared by a process which comprises mixing substantially simultaneously the polyalkylene ether alcohol having from 2 to 3 hydroxyl groups with not more than about 50% of the polyalkylene ether alcohol having 3 hydroxyl groups, said polyalkylene ether alcohol having a molecular weight of at least about 1,000 and a hydroxyl number of not more than about 112, from about 1% to about 2% water based on the weight of said polyalkylene ether alcohol, and from about 65% to about 85% of that amount of organic diisocyanate theoretically required for an —NCO group to react with each of the reactive hydrogen atoms of the water and hydroxyl groups of the polyalkylene ether alcohol to form an expanded cellular product, said cellular product collapsing into a gum-like hydroxyl-terminated polyurethane adduct.

11. The product of claim 10 wherein the polyalkylene ether alcohol is a polypropylene ether alcohol.

References Cited in the file of this patent

UNITED STATES PATENTS

| | | |
|---|---|---|
| 2,764,565 | Hoppe et al. | Sept. 25, 1956 |
| 2,785,150 | Kreider et al. | Mar. 12, 1957 |
| 2,850,424 | Finelli et al. | Sept. 2, 1958 |
| 2,866,774 | Price | Dec. 30, 1958 |
| 2,871,227 | Walter | Jan. 27, 1959 |
| 2,897,181 | Windemuth | July 28, 1959 |

FOREIGN PATENTS

| | | |
|---|---|---|
| 1,065,377 | France | Feb. 10, 1958 |

OTHER REFERENCES

Heiss et al.: Ind. & Eng. Chem., vol. 46, No. 7, July 1954, pages 1498–1503.